Nov. 28, 1967     V. L. MIDDLETON     3,354,530

METHOD FOR PREPARING EXPANDED PRESSURE PASSAGEWAY PRODUCTS

Filed June 25, 1964

INVENTOR.
VERNE L. MIDDLETON
BY
Robert H. Bachman

United States Patent Office 3,354,530
Patented Nov. 28, 1967

3,354,530
METHOD FOR PREPARING EXPANDED PRESSURE PASSAGEWAY PRODUCTS
Verne L. Middleton, East Alton, Ill., assignor to Olin Mathieson Chemical Corporation, a corporation of Virginia
Filed June 25, 1964, Ser. No. 377,815
4 Claims. (Cl. 29—157.3)

The present invention relates to the preparation of expanded pressure-welded passageway panels. More particularly, the present invention relates to passageway panels of the above type having one side thereof expanded to a greater degree than at least a portion of the opposing side.

In the conventional expansion of pressure-welded panels containing a non-welded passageway pattern corresponding to a predetermined pattern of weld inhibiting material, hydraulic expansion of the non-welded pattern results in passageways bulged out of both sides of the panel. For numerous applications it is desirable to expand pressure-welded passageway panels on one side only, leaving at least a portion of the opposing side either flat or only slightly bulged. The major reason for using one side flat or partial flat parts is when conventional panels are used as refrigerator evaporators they suffer mechanical damage in field service due to ice picks and table knives, etc., used to chip frost from the bottom of the evaporator. One side flat or partial flat parts overcome this problem to a great extent.

Previous methods for forming panels of this type have been subject to one or more significant disadvantages. For example, one method for preparing this type of panel utilizes a reciprocating pair of press platens and inflates the partially flat segment into a rubber pad, to obtain a lower tube height, while normally expanding the other segments to the desired height. This procedure is subject to numerous disadvantages. For example, the press platens compressing the rubber causes rubber spread which cannot be contained at a given size and which in turn causes an inconsistent transition area from the flat segment to the normally expanded segment. That is, when a panel is to contain both flat and non-flat segments, the transition area between these segments is inconsistent due to the rubber spread over the flat segment. Another disadvantage is the concavity on the inflated side of the flat segment caused by the reaction of the compressed rubber against the expanded tube after the expanding pressure is released. Furthermore, panels inflated by this procedure are characterized by a general lack of uniformity in the flat segment from panel to panel.

Accordingly, it is a principle object of the present invention to provide a process for preparation of an expanded, pressure-welded passageway panel having one side thereof expanded to a greater degree than at least a portion of the opposing side.

It is a further object of the present invention to provide a process as aforesaid which results in a panel having a relatively straight transition line from the partially flat area to the two side inflated area.

A further object of the present invention is to provide a process as aforesaid which eliminates the difficulty of concavity on the inflated side of the flat segment.

A still further object of the present invention is to provide a process as aforesaid which results in general uniformity in the flat segment from panel to panel.

Other objects and advantages of the present invention will appear hereinafter.

In accordance with the present invention it has now been found that the foregoing objects of the present invention may be conveniently accomplished. The present invention is a method of preparing an expanded, pressure-welded, passageway panel having one side thereof expanded to a greater degree than at least a portion of the opposing side. The process of the present invention comprises: placing on a first sheet of metal a weld-inhibiting material in a pattern corresponding to a predetermined configuration of fluid passageways; superposing a second sheet of metal in intimate contacting relationship with at least a portion of said weld-inhibiting material; forming an assembly by superposing a third sheet of metal over said first and second sheets of metal; pressure welding said assembly in the areas thereof not separated by weld-inhibiting material; and introducing an expansion pressure into the areas separated by said weld-inhibiting material to expand said areas outwardly, whereby said first sheet of metal is expanded to a greater degree than that portion of the opposing side covered with said second sheet of metal.

The present invention will be described in greater detail with reference to the accompanying drawings in which.

In the fabrication of hollow sheet metal panels of the aforementioned type, two sheets of metal are arranged in a stack-like fashion with a design of weld-inhibiting material applied to a portion of one of the adjacent faces of the sheets in a pattern corresponding to the desired system of fluid passageways. The sheets are then welded together in the adjacent areas not separated by the weld-inhibiting material, as by hot rolling, to form a sheet metal blank. If the sheets are welded together by hot rolling they are elongated in the direction of rolling and therefore the passageway design of weld-inhibiting material must be foreshortened in the intended direction of rolling when it is applied to the sheet. Subsequent to the welding step the sheets are usually softened, as by annealing, and the unjoined portion corresponding to the pattern of weld-inhibiting material is outwardly expanded as by the injection therein of a fluid pressure of sufficient magnitude to permanently distend the sheets in the area adjacent to the weld-inhibiting design, thereby forming a hollow passageway panel. The aforementioned process is fully described in the patent to Grenell, U.S. 2,690,-002, issued Sept. 28, 1954.

The present invention as aforesaid is concerned with the foregoing process whereby one side of the pressure welded passageway panel is expanded to a greater degree than at least a portion of the opposing side. In accordance with the present process a metal insert is interposed between the passageway defined by the pattern of weld-inhibiting material and the cover sheet in the portion wherein the flat configuration is desired. As discussed above and as will be evident hereinafter this simple expedient results in numerous advantages over conventional processes.

Figure 1:
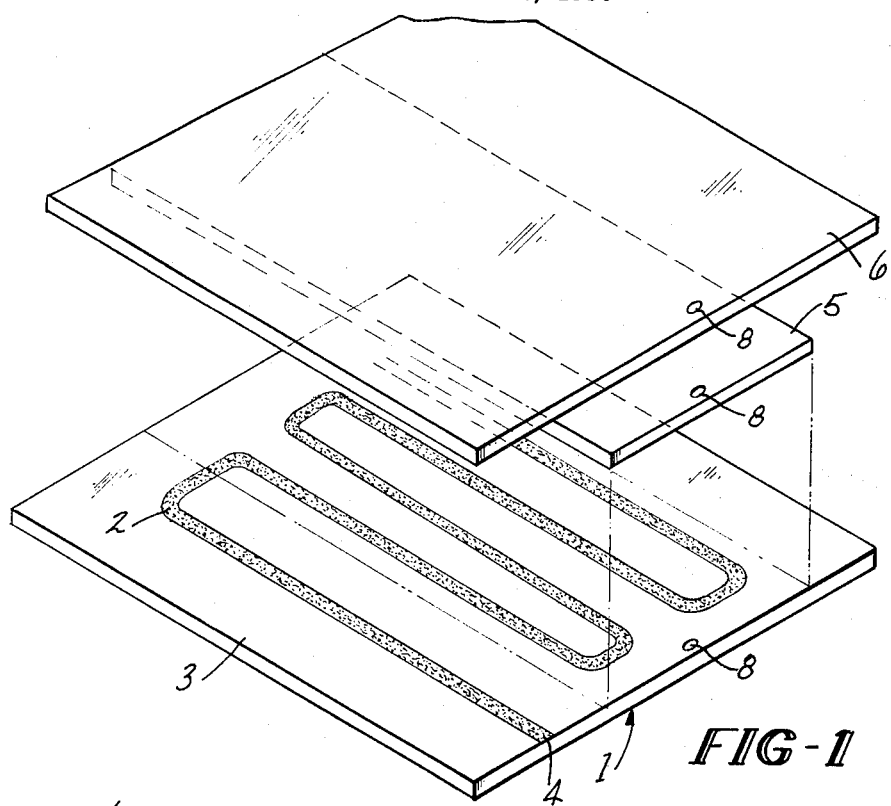
FIGURE 1 is an exploded view in perspective of the components necessary to form the composite of the present invention.

The present process will be more readily apparent from a consideration of the aforementioned drawings. Referring to the drawings, FIGURE 1 shows a first sheet of metal 1 with a design of weld-inhibiting material 2 applied to a clean surface thereof 3. The design 2 may be extended to the edge of the sheet as shown at 4 to subsequently form an inlet for fluid pressure injection. The design 2 is foreshortened in the intended direction of subsequent rolling. The surface of the sheet may be cleaned in any conventional manner, as by brush-scrubbing.

Figure 2:
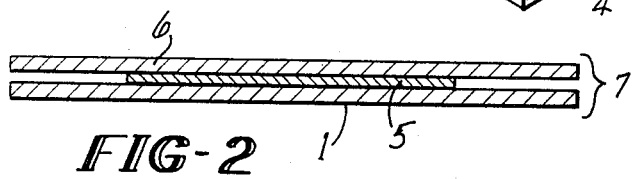
FIGURE 2 is a side view of the assembled components in enlarged scale prior to the rolling operation.

FIGURE 1 shows a second sheet of metal 5 to be superposed in intimate, contacting relationship with at least a portion of the weld-inhibiting material 2 in the manner shown in FIGURE 2 in the area wherein the flat configuration is desired. A third sheet of metal 6 is placed over said second sheet of metal 5 and said first sheet of metal 1 and the components are sandwiched together to form an assembly 7 in the manner shown in FIGURE 2. The entire assembly is spot-welded 8 through the insert area.

Figure 3:
FIGURE 3 is a side view of the assembled components during the rolling operation.

The assembly 7 is then pressure welded by hot rolling between rolls 9 and 10 as shown in FIGURE 3, with the arrows indicating the direction of the rolling. This hot rolling step results in a pressure welded assembly containing unwelded portions corresponding to the pattern of weld-inhibiting material.

Figure 5:
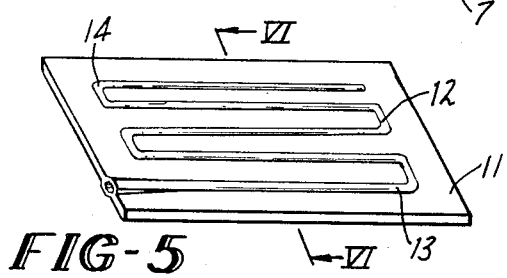
FIGURE 5 is a perspective view of the reverse side of the panel shown in FIGURE 4.
Figure 6:
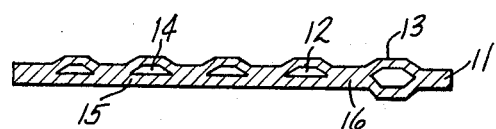
FIGURE 6 is a sectional view taken along the line VI—VI of FIGURE 5.
Figure 4:
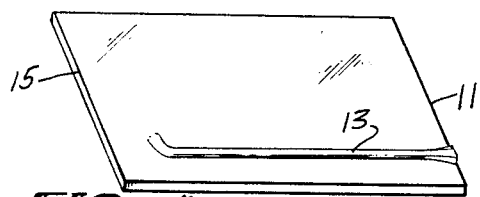
FIGURE 4 is a perspective view of the upper side of the finished panel subsequent to the expansion operation.

Subsequent to the hot rolling step, the non-welded areas corresponding to the pattern of weld-inhibiting material are expanded in the conventional manner, for example, by placing between flat reciprocating press platens and injecting fluid pressure into the inlet 4 whereupon the areas separated by weld-inhibiting material are expanded. FIGURES 4 through 6 show the configuration of the expanded panel of FIGURE 1. The resultant passageway panel 11 contains the desired system of passageways 12 corresponding to the pattern of weld-inhibiting material. Those portions of the weld-inhibiting material which were not covered by insert 5 are expanded on both sides of the panel 13 as can be seen from FIGURES 4-6; whereas those portions of the weld-inhibiting material which were covered by insert 5 are expanded on only one side of the panel 14 with the other side 15 remaining substantially flat and with the transition area 16 between the partially flat area to the two side inflated area as a relatively straight line.

As will be readily apparent from the foregoing, no rubber pad or other external source is required to produce an end product with equivalent mechanical damage resistance to those produced with rubber pads or other external pressure sources. It should be, of course, realized that if desired a rubber pad or other external pressure source may be used in conjunction with the process of the present invention in order to obtain particular results.

In addition, it will be noted that the transition from the partially flat area to the two side inflated area is a relatively straight line, uniform from plate to plate, thereby allowing a considerable reduction in the allowable area for the transition.

In addition, it will be realized that the process of the present invention presents no concavity problem due to the lack of external pressure source. In addition, other advantages of the present invention include general uniformity in the flat segment from panel to panel, thicker metal in the flat segment providing additional protection against both mechanical and corrosion damage and an economical and inexpensive process.

The present invention is applicable preferably to aluminum and aluminum alloys; however, the present invention is fully applicable to other metals which may be utilized for forming an article of the above type. The only requirement in the preparation of the article of the present invention is that the three or more sheets utilized be susceptible of forming a pressure-welded assembly in the foregoing manner. A particular preferred assembly utilizes as the first and the third sheets 1100 aluminum alloy and utilizes as the insert sheet aluminum alloy 3003.

Any fluid pressure inflation is contemplated in accordance with the present invention, for example, either air or hydraulic pressure may be conveniently used.

The present process is preferably applicable where it is desired to form a single panel containing both two side and one side inflation in view of the foregoing advantages of the present process in this type of article; however, the present process is fully applicable where it is desired to keep an entire side flat or relatively flat. It should be realized that the characteristics of the flat side will naturally vary depending upon the particular alloys used and in particular the insert utilized. It may be desirable, for example, to provide an article with the side containing the lesser amount of expansion expanded one half as much as the fully expanded side. The control of these variables will readily suggest themselves to those skilled in the art.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. The method of preparing an expanded pressure welded passageway panel having one side thereof expanded to a greater degree than at least a portion of the opposing side, which comprises: placing on a first sheet of metal a weld-inhibiting material in a pattern corresponding to a predetermined configuration of fluid passageways; superposing a second sheet of metal in intimate, contacting relationship with at least a portion of said weld-inhibiting material; forming an assembly by superposing a third sheet of metal over said first and second sheets of metal; pressure welding said assembly in the areas thereof not separated by weld-inhibiting material; and introducing an expansion pressure into the areas separated by weld-inhibiting material to expand said areas outwardly, whereby said first sheet of metal is expanded to a greater degree than that portion of the opposing side covered with said second sheet of metal.

2. The method of preparing an expanded pressure welded passageway panel having one side thereof expanded to a greater degree than a portion of the opposing side, which comprises: placing on a first sheet of metal a weld-inhibiting material in a pattern corresponding to a predetermined configuration of fluid passageways; superposing a second sheet of metal intimate, contacting relationship with a portion of said weld-inhibiting material; forming an assembly by superposing a third sheet of metal over said first and second sheets of metal; pressure welding said assembly in the areas thereof not separated by weld-inhibiting material; and introducing an expansion pressure into the areas separated by weld-inhibiting material to expand said areas outwardly, whereby said first sheet of metal is expanded to a greater degree than that portion of the opposing side covered with said second sheet of metal.

3. A method according to claim 1 wherein said first and third sheets are 1100 aluminum alloy wherein said second sheet is 3003 aluminum alloy.

4. A method according to claim 2 wherein said first and third sheets are 1100 aluminum alloy and wherein said second sheet is 3003 aluminum alloy.

References Cited

UNITED STATES PATENTS

| | | | |
|---|---|---|---|
| 2,966,729 | 1/1961 | Dedrick | 29—157.3 |
| 3,173,195 | 3/1965 | Lemelson | 29—157.3 |
| 3,222,763 | 12/1965 | Heuer | 29—157.3 |

JOHN F. CAMPBELL, *Primary Examiner.*

J. D. HOBART, J. L. CLINE, *Assistant Examiners.*